(12) United States Patent
Janssen et al.

(10) Patent No.: US 9,043,812 B2
(45) Date of Patent: May 26, 2015

(54) DYNAMIC RULE MANAGEMENT FOR KERNEL MODE FILTER DRIVERS

(71) Applicant: Real Enterprise Solutions Development B.V., 'S-Hertogenbosch (NL)

(72) Inventors: Bob Janssen, Lage Zwaluwe (NL); Henri Van Bommel, Sommeren (NL)

(73) Assignee: Real Enterprise Solutions Development B.V., 'S-Hertogenbosch (NL)

( * ) Notice: Subject to any disclaimer, the term of this patent is extended or adjusted under 35 U.S.C. 154(b) by 0 days.

(21) Appl. No.: 13/924,879

(22) Filed: Jun. 24, 2013

(65) Prior Publication Data
US 2014/0007139 A1    Jan. 2, 2014

(51) Int. Cl.
*G06F 9/54* (2006.01)
*G06F 9/44* (2006.01)
*G06F 9/445* (2006.01)

(52) U.S. Cl.
CPC .......... *G06F 9/4411* (2013.01); *G06F 9/44589* (2013.01)

(58) Field of Classification Search
CPC ..... G06F 15/177; G06F 21/554; G06F 9/505; G06F 2009/45579; G06F 21/00; G06F 21/51; G06F 21/62; G06F 2221/2149; G06F 9/4411; G06F 9/54
See application file for complete search history.

(56) References Cited

U.S. PATENT DOCUMENTS

| | | | |
|---|---|---|---|
| 2006/0075381 A1* | 4/2006 | Laborczfalvi et al. | 717/100 |
| 2006/0085838 A1* | 4/2006 | Samuelsson et al. | 726/1 |
| 2009/0106780 A1* | 4/2009 | Nord et al. | 719/329 |
| 2009/0178103 A1* | 7/2009 | Graham et al. | 726/1 |
| 2012/0059776 A1* | 3/2012 | Estes | 706/11 |

OTHER PUBLICATIONS

European Search Report of the European Patent Office Patent Office in counterpart foreign application EP 12174122.7 filed Jun. 28, 2012.
Eli Billauer: "Breaking the Ice with SELinux", Dec. 8, 2008, pp. 1-67, XP002687619.

\* cited by examiner

*Primary Examiner* — Tuan Dao
(74) *Attorney, Agent, or Firm* — Steven M. Koehler; Westman, Champlin & Koehler, P.A.

(57) ABSTRACT

A method for providing rules for a plurality of processes from a user mode to a kernel mode of a computer is disclosed. The method includes providing to the kernel mode a policy for at least a first process of the plurality of processes, the policy indicating at least when and/or how notifications are to be provided from the kernel mode to the user mode upon detection in the kernel mode of launching of the first process. The method further includes selecting, from the rules stored in the user mode, rules related to the launching of the first process, in response to receiving from the kernel mode a first notification in accordance with the policy, and providing the selected rules related to the launching of the first process from the user mode to at least one of the one or more filter drivers in the kernel mode.

22 Claims, 4 Drawing Sheets

DYNAMIC RULE MANAGEMENT FOR KERNEL MODE FILTER DRIVERS

FIELD OF THE INVENTION

The present invention relates to computing systems. More specifically, aspects of the invention relate to rule management for kernel mode filter drivers.

BACKGROUND

The discussion below is merely provided for general background information and is not intended to be used as an aid in determining the scope of the claimed subject matter. When a user logs in to a computer, a user session is created. In that user session applications are being used. Each application includes one or more processes running in the user session. In order to provide a secure and robust environment to the user, each process should be controlled by applying certain security constraints. These constraints can be applied on different levels, such as a process level establishing e.g. whether the process is allowed to run and/or whether the rights assigned to the process is to be elevated, a file level establishing e.g. whether files are allowed to be read or written by a process, a registry level establishing e.g. whether registry settings are allowed to be read or written by a process, or a network level establishing e.g. whether data is allowed to be sent and/or received to/from the network.

Whether and how processes within a user session should be controlled is provided in rules. Controlling the processes is done via filter drivers implemented in the kernel mode of the computer and a rule provider implemented in the user mode, schematically shown in FIG. 1A illustrating a typical computer 100. As shown, the computer 100 comprises a user mode 110, a kernel mode 120, and an application programming interface (API) 115 which provides a communication medium between the user mode 110 and the kernel mode 120. The user mode 110 comprises at least one software application 112 that could be run, which, in turn, includes at least one process 114. The user mode 110 also comprises a rule provider 116 storing rules for all of the processes that could, potentially, be running in the user mode 110 of the computer 100. The kernel mode 120 comprises various kernel mode filter drivers, shown as a filter driver (FD) 122, a FD 124, and a FD 126, designed to control access of processes to computer resources (e.g. a computer resource could be a network interface card and the process could be a process within a web browser application that needs network access).

Typically, the process 114 is controlled in a manner illustrated in FIGS. 1B and 1C. Such control includes the rule provider 116 providing all possible rules (i.e., all of the rules associated with each of the processes which may possibly be run on the computer 100) to the various kernel mode filter drivers as the user session is being started and/or as the computer is being turned on. This is shown in FIG. 1B with arrows 132, 134, and 136, where the arrow 132 illustrates all rules relevant to the FD 122 being provided to the FD 122, the arrow 134 illustrates all rules relevant to the FD 124 being provided to the FD 124, and the arrow 136 illustrates all rules relevant to the FD 126 being provided to the FD 126. When a filter driver intercepts a request to execute a particular process indicating launching of the process, the driver goes through all of the rules stored therein to determine how the request should be handled, i.e. whether the process should be allowed to run, should be elevated, should be blocked, etc. A filter driver intercepting such a request (arrow 138) from the process 114 to the filter driver 124 is illustrated in FIG. 1C. In such an example, the filter driver 124 goes through all of the rules provided to it from the rule provider 116 in order to make a decision as to how the process 114 should be handled. Once the decision is made, the filter driver 124 provides an indication to the process 114 regarding whether and/or how the process 114 is allowed to continue (this step is not shown in FIGS. 1B-1C).

One problem with the implementation illustrated in FIGS. 1B-1C arises when a computer includes a large number of processes which may be run, where each application is associated with a large number of rules. In such a situation, providing all of these rules to the filter drivers results in the long start up time and large claim on the scarce kernel resources. Another problem is that the filter drivers having to search through the large number of rules stored therein to find the rules applicable to a particular process being launched also results in slow processing of rules in runtime.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. An aspect of the invention provides a method and a system for management of rules for kernel mode filter drivers in a manner that improves on at least some of the drawbacks of the current implementation described above.

In different aspects of the invention, three methods that allow providing rules for a plurality of processes from a user mode to a kernel mode of a computer are disclosed. The first method is a method implemented in the user mode of the computer. The second method is a corresponding method implemented in the kernel mode of the computer. The third method is a method including steps implemented both in the user and in the kernel modes. For all of the methods, the processes can be launched in the user mode of the computer, while the rules are provided from the user mode to one or more filter drivers implemented in the kernel mode.

The first method comprises the step of providing, from the user mode to the kernel mode, a policy for at least a first process of the plurality of processes, the policy indicating at least when and/or how notifications are to be provided from the kernel mode to the user mode upon detection in the kernel mode of launching of the first process. The first method further includes the steps of selecting, from the rules stored in the user mode, rules related to the launching of the first process, in response to receiving from the kernel mode a first notification in accordance with the policy for the first process, and providing the selected rules related to the launching of the first process from the user mode to at least one of the one or more filter drivers in the kernel mode.

The second method includes the steps of obtaining, in the kernel mode, a policy for at least a first process of the plurality of processes, the policy indicating at least when and/or how notifications are to be provided from the kernel mode to the user mode upon detection in the kernel mode a launching of the first process, and, in response to detecting the launching of the first process, providing a first notification from the kernel mode to the user mode in accordance with the received policy for the first process, where the first notification provides a trigger to the user mode for selecting, from the rules stored in the user mode, rules related to the launching of the first process, and for providing the selected rules related to the launching of the first process to at least one of the one or more filter drivers.

The third method includes the steps of obtaining a policy for at least a first process of the plurality of processes, the policy indicating at least when and/or how notifications are to be provided from the kernel mode to the user mode upon detection in the kernel mode of launching of the first process and, in response to receiving, in the user mode from the kernel mode, a first notification in accordance with the policy for the first process, selecting, from the rules stored in the user mode, rules related to the launching of the first process. The third method further includes the steps of providing the selected rules related to the launching of the first process from the user mode to at least one of the one or more filter drivers.

All of three methods could also include an optional step of providing an indication to the first process regarding whether and/or how the first process is allowed to continue in accordance with the selected rules related to the launching of the first process. Such indication could include e.g. blocking the first process, replacing security token for the first process, injecting a dynamically linked library (DLL), and/or loading additional rules, stored in non-paged pool (i.e., stored in a memory that is always physical present and is a scarce system resource), for the first process and/or for a user session in which the first process was launched pool.

An aspect of the present invention is based on the recognition that loading rules to the filter drivers of the kernel mode of a computer only on as-needed basis, i.e. when rules are loaded only after a process has been launched and relate only to that process instead of loading rules related to all processes that could potentially be run on the computer, and, optionally, removing the rules when they are no longer needed allows decreasing demands on the limited memory and processing resources in the kernel without compromising the security of the system.

Management of when and which rules are loaded may be achieved by specially configuring a so-called a "managing kernel unit" (MKU) implemented in the kernel mode of a computer and specially configuring a so-called "process management unit" (PMU) implemented in the user mode of that computer. The rules for all of the processes that could be launched in the user mode of the computer are stored in a rule provider in the user mode. The MKU is configured to register itself with the operating system of the computer, which registration allows the MKU to detect when a new process is being launched by intercepting request of that process to access the computer resources that the filter drivers in the kernel mode are intended to control access to. The MKU is provided with policies, typically upon initiation of a user session, as to whether and/or when and/or how the MKU should provide notifications to the PMU upon detection of the activations of new processes. Such policies are typically established by a knowledge engine, i.e. the policies can be e.g. "just-in-time" generated based on the actual environment, system configuration, etc., or stored in a knowledge database. By providing a notification to the PMU indicating that a new process has been launched, the MKU triggers the PMU to access the rule provider to determine whether there are any rules related to the newly launched process that should be provided to the kernel mode filter drivers and to provide such rules to the appropriate filter drivers. As a result, when a process makes a request to access a resource that a particular filter driver is intended to control access to, the filter driver can quickly identify the rules related to that process and handle the request accordingly. A similar approach could be followed in removing rules loaded to the filter drivers when a process that was launched is rundown (i.e., when the execution of the process stops). With such dynamic managements of rules for the filter drivers, start up time of the computer can be decreased because all rules for all processes that could potentially run in the user mode of the computer no longer need to be loaded to the filter drivers at start up. In addition, only loading the rules to the filter drivers on as-needed basis results in decrease of runtime response times and demand on the kernel's memory and processing power because the filter drivers have to store and process significantly less rules compared to the prior art implementation described above.

According to other aspects of the invention devices adapted to carry out methods having one or more of the above mentioned features are proposed. For the first method, the device could be a PMU, while for the second method, the device could be an MKU. Such devices could be implemented in hardware, in software, or a combination of both. In a preferred embodiment, the MKU could be a specially configured filter driver implemented in the kernel mode of the computer.

Still other aspects of the invention relate to a computer program and a, preferably non-transitory, computer-readable storage medium storing computer program for performing each of the methods having one or more of the above mentioned features. This advantageously enables at least some of the device functionality to be implemented in software.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE ILLUSTRATIVE EMBODIMENT

Figure 1:
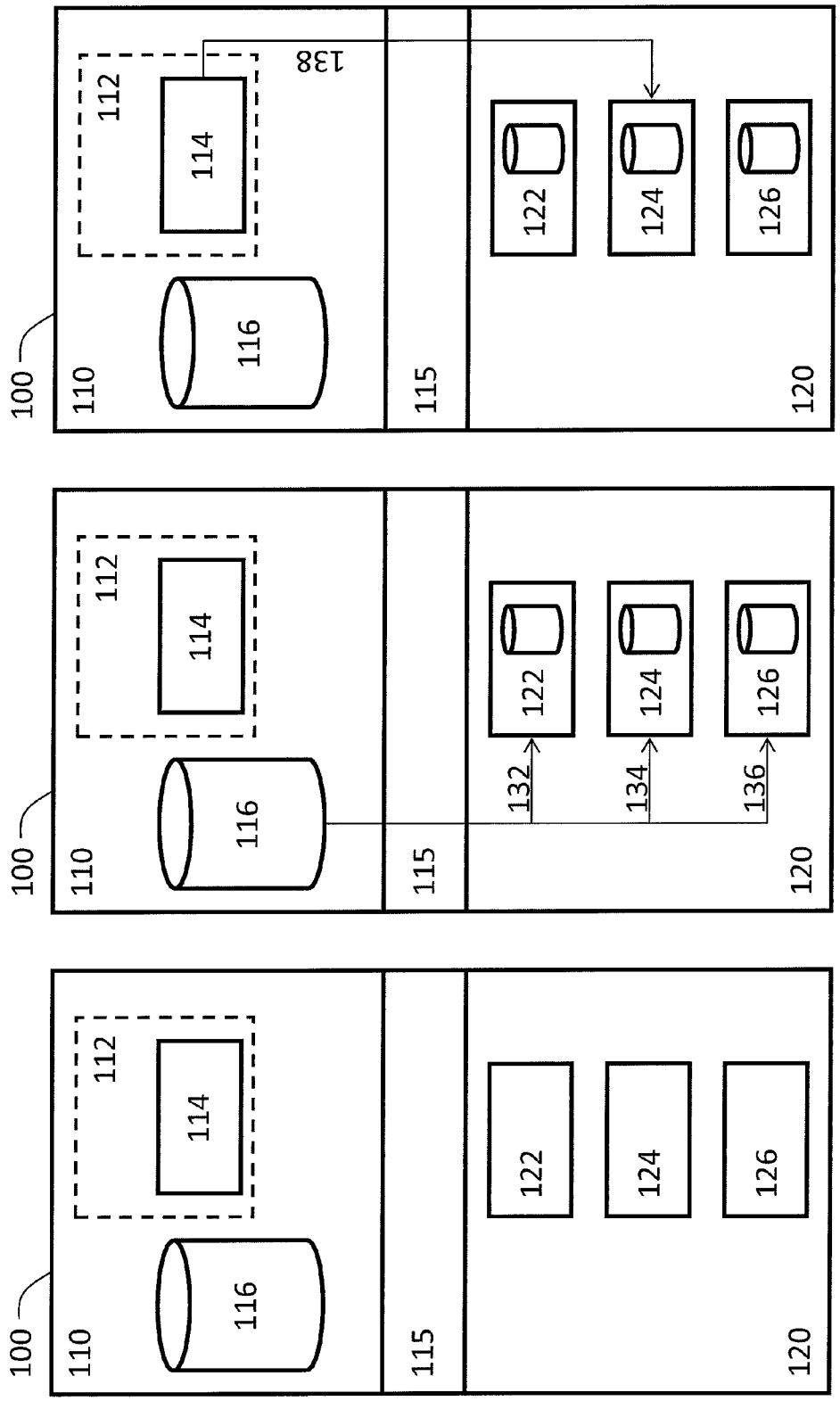
FIGS. 1A-1C provide an exemplary illustration of controlling a process by providing rules to kernel mode filter drivers, according to prior art.
Figure 2:
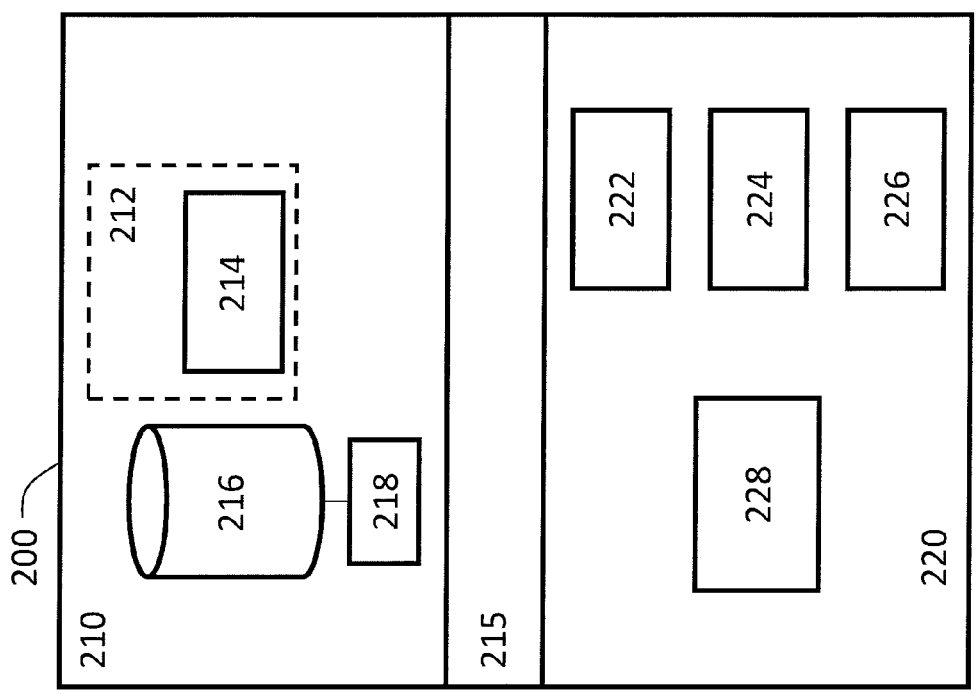
FIG. 2 provides an exemplary illustration of a computer capable of controlling processes by providing rules to kernel mode filter drivers, according to one embodiment of the present invention.

FIG. 2 provides an exemplary illustration of a computer 200 capable of controlling processes by providing rules to kernel mode filter drivers, according to one embodiment of the present invention. As shown, the computer 200 comprises a user mode 210, a kernel mode 220, and an API 215 which provides a communication medium between the user mode 210 and the kernel mode 220. As used herein, the expression "a computer comprises a user mode and a kernel mode" and similar expressions are used to describe that an operating system of the computer can run in two modes—a non-privileged mode (i.e., the user mode) and a privileged mode (i.e., the kernel mode).

The user mode 210 comprises at least one software application 212 that could be run on the computer 200, which application, in turn, includes at least one process 214. While only one application including one process is shown in FIG. 2 in order to simplify the explanations provided herein, in a typical computer environment there are many software applications, each application comprising plurality of processes that could be launched. Examples of software applications include text editing software, a web browser, or a computer video game, while examples of processes that could be launched as a part of each of these applications include one or more executable programs such as notepad.exe, calculater.exe, or PdfReader.exe.

The user mode 210 also comprises a rule provider 216 storing rules for all of the processes that could be launched in the user mode 210 of the computer 200. A rule may be viewed as a data structure containing parameters needed to make a decision on how a particular kernel mode filter driver should act when it intercepts a request for the launching of the process. When such a rule is provided to the particular kernel mode filter driver within the kernel mode 220, the filter driver can respond to a request from a process in a manner that preserves security of the computer environment. For example, for a voice message process, the rule provider 216 could store one rule for the file system filter driver to only allow local file access to voice messages and another rule for the network driver to only allow access to the website that stores additional voice mail messages. Another rule in the registry filter driver may be loaded to turn on monitoring of registry access for the voice message application.

In an embodiment, the rules stored in the rule provider 216 are validated for a user session in which the process 214 was launched. Rule validation comprises checking that the rules can be processed whenever needed, which is important to prevent problems at run time as incompatible or incomplete rules may cause unpredictable results. Carrying out validation proactively by validating the rules stored in the rule provider for the particular user session is intended to prevent or at least diminish these problems.

In an embodiment, the rules could be organized and optimized for performance by supporting existing pre-fetching mechanisms and using enhanced locking mechanisms. Efficient storage of these rules in memory allows better processing speed.

In addition to storing the rules, the rule provider 216 could also store policies for each of the processes that could be launched. A policy indicates when and/or how a notification is to be provided from the kernel mode 220 to the user mode 210 when the kernel mode 220 detects launching of a process in the user mode 210. For example, for a voicemail process, a policy could indicate to the MKU 228 to send a notification on voice mail process startup and rundown. In an embodiment, the rule provider 216 could be implemented as a storage external to the computer 200 but to which the computer 200 has access to, e.g. in a form of an external database.

The user mode 210 also includes a PMU 218 cooperating with an MKU 228 implemented in the kernel mode 220. As described in greater details in association with FIGS. 3A and 3B, the MKU 228 is configured to enable process notification and process control while the PMU 218 is configured to provide rules for the processes that could be launched in the user mode 210 to the kernel mode 220. While the descriptions below are provided referring to the PMU 218 and the MKU 228 as "devices", such term implies that, in various embodiments, the functionality of the PMU 218 and the MKU 228 may be implemented in hardware, software, or any combination of hardware and software, and could be distributed among a plurality of such devices.

In a preferred embodiment, the computer 200 is such that there is a separate instance of the user mode 210 for each user session. In other words, the application 212 could be an application running in a particular user session, and the rule provider 216 and the PMU 218 could run in each user session, independent of other user sessions, for providing to the kernel mode 220 rules for the processes that could be launched in that user session.

The kernel mode 220 comprises one or more kernel mode filter drivers, illustrated in the exemplary embodiment of FIG. 2 as filter drivers 222, 224, and 226, designed to provide security to the computer 200 by controlling access of processes executed in the user mode 210 to computer resources associated with the computer 200 (the computer resources not shown in FIG. 2). For example, the filter driver 222 could be a network filter driver for controlling access of the process 214 to a network that the computer 200 is connected to, the filter driver 224 could be a registry filter driver for monitoring and controlling registry access, while the filter driver 226 could be a file system filter driver for monitoring and controlling file system access.

Figure 3A:
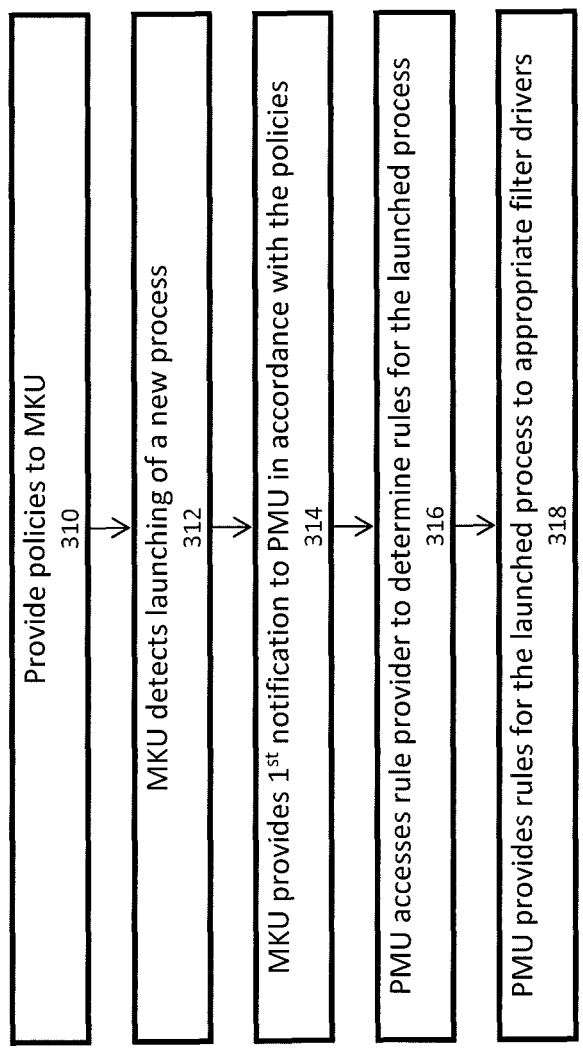
FIG. 3A provides a flow diagram of method steps for providing rules for a launched process to appropriate kernel mode filter drivers, according to one embodiment of the present invention.

FIG. 3A provides a flow diagram of method steps for providing appropriate rules for the process 214 to appropriate kernel mode filter drivers of the kernel mode 220, according to one embodiment of the present invention. In various further embodiments, the method of FIG. 3A may continue with one or more of optional method steps illustrated in FIG. 3B.

Figure 3B:
FIG. 3B provides a flow diagram of optional method steps to be carried out after the method steps of FIG. 3A, according to various embodiments of the present invention.

The method steps of FIGS. 3A and 3B are first described in conjunction with an exemplary architecture of the computer 200 illustrated in FIG. 2. However, while the method steps of FIGS. 3A and 3B may be described in conjunction with FIG. 2, persons skilled in the art will recognize that any system configured to perform the method steps, in any order, is within the scope of the present invention.

The method begins in step 310 where policies are provided to the MKU 228. The provided policies include at least one policy related to notifications for the process 214, but, preferably, include multiple policies for all processes that could be launched in the user mode 210. Such policies could initially be stored in the rule provider 216 and provided, e.g. by the PMU 218 or by some other entity within the user mode 210 such as e.g. the application 212, to the MKU 228 e.g. upon start up of a computer. In an embodiment, the policies and the rules stored in the rule provider 216 comprise policies and rules specific to a particular user session. In this case, the policies could be provided only for the process which could be launched in a particular user session upon start of the user session, typically at log in of the user.

In step 312, the MKU 228 detects launch of a new process, e.g. the process 214 illustrated in FIG. 2. In an embodiment, the MKU 228 could be a kernel mode filter driver similar to the filter drivers 222, 224, and 226, which may be registered with the operating system of the computer and, as a result of the registration, able to receive notifications when a new process is launched and when the launched process is rundown. In response to detecting the launch of the process 214, the MKU 228 refers to the policies provided to it in step 310 to identify a policy related to the process 214. The method then continues to step 314, where the MKU 228 provides a first notification to the PMU 218 that is in accordance with the policy for the process 214. Thus, the MKU 228 is configured to notify the PMU 218 of process activations based on policies previously provided to the MKU 228 from the user mode 210.

The method then proceeds to step 316, where, in response to receiving the notification of step 314 from the MKU 228, the PMU 218 accesses the rule provider 216 to determine whether there are any rules associated with the launching of the process 214 that need to be provided to any of the filter drivers in the kernel mode 220 and possibly to the MKU 228. If so, then in step 318 the PMU 218 starts setting up secure environment associated with the launched process 214 by loading appropriate rules to the appropriate filter drivers in the kernel mode 220. Step 318 may also include loading certain rules for the process 214 to the MKU 228, when the MKU 228 is implemented as a filter driver. In various embodiments, the rules required by the one or more filter drivers for the launched process 214 may be loaded to the respective filter drivers, either directly from the rule provider 216 to the filter drivers in the kernel mode 220, from the rule provider 216 to the PMU 218 and then to the individual filter drivers in the kernel mode 220, or from the rule provider 216 to the PMU 218 and then to the MKU 228 which can provide the rules to the individual filter drivers. Once the rules are loaded to the appropriate filter drivers in the kernel mode 220, the filter drivers that intercept requests from the process 214 are able to handle the requests according to the rules in a manner that it is currently done in prior art implementations. In addition to providing the appropriate rules in step 318, in one embodiment, as a part of setting up the secure environment for the process, the PMU 218 could also e.g. copy necessary files into folders, start up other processes, and perform other actions as known in the art for creating a dedicated, preset, user-specific environment adapted to the user. Furthermore, system resources, such as e.g. CPU, memory, disk space, and number of network connections could be trimmed or extended. Also as a part of setting up the secure environment for the process 214, the PMU 218 could block the process 214 from executing and/or inject a DLL, which is an extension to a process that can be used to change behaviour of that process to limit or extend or manage its capabilities.

In an optional embodiment, as a part of step 316, the PMU 218 may determine which rules stored in the rule provider 216 for the process 214 are applicable for a particular user session in which the process was launched. In this manner, only the rules relevant for the particular user session will be loaded to the filter drivers in step 318.

In an optional embodiment, the method of FIG. 3A could continue with step 320 of FIG. 3B, where the PMU 218 would also provide a notification to the MKU 228 regarding the rules that were provided in step 318. Various processes have various security tokens associated with them, the token determining what the process is allowed to do/access. Normally, when a process is launched, a token for that process is obtained from an application that launched the process and used in the user mode 210. As a part of step 320, the PMU 218 could instruct the MKU 228 to replace the token for the launched process 214, the token being stored in user mode memory. Alternatively or additionally, as a part of step 320, the PMU 218 could instruct the MKU 228 to re-process the rules that may have been loaded to the MKU in step 318. If this is the case, then the MKU 228 could re-process the rules as instructed by the PMU 218 in step 322 shown in FIG. 3B.

In step 324, based on the notification received from the PMU 218 in step 320, the MKU 228 could provide an indication to the launched process 214 as to how the process 214 is allowed to proceed. Such an indication could be e.g. an indication that the process 214 is not allowed to run or may be allowed to continue. At this point, optional changes may have been applied to the process 214 by the PMU 218 and/or the MKU 228 to limit or expand its behaviour and capabilities. For example, the process may be allowed to only open documents stored in specific locations, only access given websites or may get extended rights to access specific objects. Also a process may be setup to be monitored for certain activities.

The method steps described above could be repeated when the launched process 214 is rundown, as the rundown procedure may require security considerations similar to those associated with the launching of a process. This is schematically illustrated in FIG. 3B with steps 326 through 336 and implies that the policies provided to the MKU 228 in step 310 also included policies indicating when and/or how notifications are to be provided from the kernel mode 220 to the user mode 210 upon detection, in the kernel mode, of rundown of the launched processes.

In step 326, the MKU 228 detects rundown of the process 214 and refers to the policies provided to it in step 310 to identify a policy related to the rundown of the process 214. The method then continues to step 328, where the MKU 228 provides a notification to the PMU 218 that is in accordance with the policy for the rundown of the process 214. The method then proceeds to step 330, where, in response to receiving the notification of step 328 from the MKU 228, the PMU 218 accesses the rule provider 216 to determine whether there are any rules associated with the rundown of the process 214 that need to be provided to any of the filter drivers in the kernel mode 220 and possibly to the MKU 228. If so, then in step 332 the PMU 218 replaces loaded rules related to the launching of the process 214 with rules related to the rundown of the process in the respective filter drivers in the kernel mode 220. If, in step 330, the PMU 218 determines that the rule provider 216 does not have rules related to the rundown of the process 214 for one of the filter drivers to which rules related to the launching of the process were loaded, then the PMU 218 may be configured to simply delete the rules loaded to that filter driver that related to the launching of the process 214. In an embodiment, the PMU 218 may be configured to select and load only the rules related to the rundown of the process 214 that are applicable to the particular user session in which the process 214 was executed. The method could then proceed to step 334, where the PMU 218 would provide a notification to the MKU 228 regarding the rules that were provided in step 332. In step 336, based on the notification received from the PMU 218 in step 334, the MKU 228 could provide an indication to the rundown process 214 as to how the process 214 is allowed to proceed. Such an indication could be e.g. an indication that other processes may need to be terminated, files may need to be saved away for future use, and/or rules may be unloaded to free up system resources.

For illustrative purposes, below is provided one particular example of dynamic rule management according to one embodiment of the present invention.

Consider that the user is using a voice message application. The application comprises only one base process (voicemsg.exe) in this case which can play selected voicemail messages. Part of these messages is stored on a local private user share, while common messages are stored on a global website that can be accessed and listened to by multiple users. The MKU 228 is configured to intercept the launching of this process and provide a notification to the PMU 218. Before process launching continues, rules are loaded from the rule provider 216 to a system file filter driver and a network filter driver in the kernel mode 220 for allowing access to the local and network voice messages while blocking access to other files that may not be used by voicemsg.exe. Also registry rules are loaded to a registry filter driver in the kernel mode 220 for monitoring registry changes. In addition, the PMU 218 sets or initiates some other entity to set the registry settings to a known state. The PMU 218 also preloads or initiates some other entity to preload some voice messages into the local file share. Additional rules that allow additional processes, needed by the voicemsg.exe, are also loaded to the appropriate filter drivers in the kernel mode 220. When above has completed, the process may continue to launch and a reply message is send to the MKU 228, which allows voicemsg.exe to complete its startup.

In the launching of the voicemsg.exe process described above, an example of a rule for blocking access of voicemsg.exe to all files could be as follows:

SessionId 5
RuleId 37, unique tag to identify this rule
Flags=1, enable this rule
Function=16, blocking rule
Access mask=0, block all access
Process name=c:\apps\voicemsg.exe
FileName=* (all files)

An example of a rule for allowing access for voicemsg.exe to access its selected local voice messages could be as follows:

SessionId 5
RuleId 38, unique tag to identify this rule
Flags=1, enable this rule
Function=17, allow rule
Access mask=0xFFFFFFFF, allow all access
Process name=c:\apps\voicemsg.exe
FileName=\voicemsgpath\*.vmg (all .vmg files)

Once the user stops the process, voicemsg.exe, the MKU 228 intercepts the rundown. Captured registry changes are used to determine the next startup values and these are saved at this point for future use. Rules that are no longer needed are unloaded from the filter drivers in the kernel mode 220. Final logging buffers are captured and processed. Then a reply is send to the MKU 228 and further process rundown is allowed.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Those skilled in the art can implement the description and/or figures as processor executable instructions, which can be written on any form of a computer readable medium.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A method for providing rules for a plurality of processes launchable in a user mode of a computer from the user mode to one or more filter drivers implemented in a kernel mode of the computer, the method comprising:
   providing, from the user mode to the kernel mode, a policy for at least a first process of the plurality of processes, the policy indicating at least when and/or how notifications are to be provided from the kernel mode to the user mode upon detection in the kernel mode of launching of the first process and when and/or how notifications are to be provided from the kernel mode to the user mode upon detection in the kernel mode of rundown of the first process;
   in response to receiving from the kernel mode a first notification in accordance with the policy for the first process, selecting, from the rules stored in the user mode, one or more rules related to the launching of the first process;
   providing the selected one or more rules related to the launching of the first process from the user mode to at least one of the one or more filter drivers in the kernel mode;
   in response to receiving from the kernel mode a third notification in accordance with the policy for the first process, selecting, from the rules stored in the user mode, one or more rules related to the rundown of the first process;
   if the rules stored in the user mode include at least one rule related to the rundown of the first process, replacing, in at least one of the one or more filter drivers to which the selected one or more rules related to the launching of the first process were provided, the provided one or more rules related to the launching of the first process with the selected one or more rules related to the rundown of the first process; and
   if the rules stored in the user mode do not include any rules related to the rundown of the first process, removing the one or more rules related to the launching of the first process from at least one of the one or more filter drivers to which the selected one or more rules related to the launching of the first process were provided.

2. The method according to claim 1, further comprising providing, from the user mode to the kernel mode, a second notification providing an identification of the selected one or more rules related to the launching of the first process.

3. The method according to claim 1, further comprising setting up security environment for the first process.

4. The method according to claim 1, further comprising:
   providing, from the user mode to the kernel mode, a fourth notification providing an identification of the selected one or more rules related to the rundown of the first process.

5. The method according to claim 1, wherein the rules stored in the user mode are validated for a user session in which the first process was launched.

6. The method according to claim 1, wherein the rules stored in the user mode are organized and optimized for performance by supporting existing pre-fetching mechanisms and using enhanced locking mechanisms.

7. A method for enabling provision of rules for a plurality of processes launchable in a user mode of a computer from the user mode to one or more filter drivers implemented in a kernel mode of the computer, the method comprising:
   obtaining, in the kernel mode, a policy for at least a first process of the plurality of processes, the policy indicating at least when and/or how notifications are to be provided from the kernel mode to the user mode upon detection in the kernel mode a launching of the first process and when and/or how notifications are to be provided from the kernel mode to the user mode upon detection in the kernel mode of rundown of the first process;

in response to detecting the launching of the first process, providing a first notification from the kernel mode to the user mode in accordance with the received policy for the first process, wherein the first notification provides a trigger to the user mode for selecting, from the rules stored in the user mode, one or more rules related to the launching of the first process, and for providing the selected one or more rules related to the launching of the first process to at least one of the one or more filter drivers;

in response to detecting the rundown of the first process, providing a third notification, from the kernel mode to the user mode, in accordance with the received policy for the first process, wherein the third notification provides a trigger for:

selecting, from the rules stored in the user mode, one or more rules related to the rundown of the first process, replacing, in at least one of the one or more filter drivers to which the selected one or more rules related to the launching of the first process were provided, the provided one or more rules related to the launching of the first process with the selected one or more rules related to the rundown of the first process, if the rules stored in the user mode include at least one rule related to the rundown of the first process, and removing the one or more rules related to the launching of the first process from at least one of the one or more filter drivers to which the selected one or more rules related to the launching of the first process were provided, if the rules stored in the user mode do not include any rules related to the rundown of the first process.

8. The method according to claim 7, further comprising:

receiving, in the kernel mode from the user mode, a second notification providing an identification of the selected one or more rules related to the launching of the first process; and in response to the first notification, providing an indication to the first process regarding whether and/or how the first process is allowed to continue.

9. The method according to claim 8, wherein providing the indication to the first process comprises blocking the first process.

10. The method according to claim 8, wherein providing the indication to the first process comprises replacing security token for the first process.

11. The method according to claim 8, wherein providing the indication to the first process comprises injecting a dynamically linked library.

12. The method according to claim 8, wherein providing the indication to the first process comprises loading additional rules for the first process and/or for a user session in which the first process was launched in non-paged pool.

13. The method according to claim 7, further comprising re-processing, in the kernel mode, at least a part of the rules related to the launching of the first process that were provided to the kernel mode.

14. The method according to claim 7, further comprising:

receiving, in the kernel mode from the user mode, a fourth notification providing an identification of the selected one or more rules related to the rundown of the first process.

15. The method according to claim 7, further comprising:

in response to the fourth notification, providing an indication to the first process regarding whether the first process is allowed to rundown.

16. The method according to claim 7, further comprising:

in response to the fourth notification, providing an indication to the first process regarding how the first process is allowed to rundown.

17. A method for providing rules for a plurality of processes launchable in a user mode of a computer from the user mode to one or more filter drivers implemented in a kernel mode of the computer, the method comprising:

obtaining a policy for at least a first process of the plurality of processes, the policy indicating at least when and/or how notifications are to be provided from the kernel mode to the user mode upon detection in the kernel mode of launching of the first process and when and/or how notifications are to be provided from the kernel mode to the user mode upon detection in the kernel mode of rundown of the first process;

in response to receiving, in the user mode from the kernel mode, a first notification in accordance with the policy for the first process, selecting, from the rules stored in the user mode, one or more rules related to the launching of the first process;

providing the selected rules related to the launching of the first process from the user mode to at least one of the one or more filter drivers;

in response to receiving, in the user mode from the kernel mode, an additional notification in accordance with the policy for the first process, selecting, from the rules stored in the user mode, one or more rules related to the rundown of the first process;

if the rules stored in the user mode include at least one rule related to the rundown of the first process, replacing, in at least one of the one or more filter drivers to which the selected one or more rules related to the launching of the first process were provided, the provided one or more rules related to the launching of the first process with the selected one or more rules related to the rundown of the first process; and if the rules stored in the user mode do not include any rules related to the rundown of the first process, removing the one or more rules related to the launching of the first process from at least one of the one or more filter drivers to which the selected one or more rules related to the launching of the first process were provided.

18. The method according to claim 17, further comprising providing an indication to the first process regarding whether the first process is allowed to continue in accordance with the selected one or more rules related to the launching of the first process.

19. The method according to claim 17, further comprising providing an indication to the first process regarding how the first process is allowed to continue in accordance with the selected one or more rules related to the launching of the first process.

20. A non-transitory, computer-readable storage medium storing instructions which, when executed by a processor in a kernel mode of a computer, perform a method for enabling provision of rules for a plurality of processes launchable in a user mode of the computer from the user mode to one or more filter drivers implemented in the kernel mode of the computer, the method comprising:

obtaining, in the kernel mode, a policy for at least a first process of the plurality of processes, the policy indicating at least when and/or how notifications are to be provided from the kernel mode to the user mode upon detection in the kernel mode a launching of the first process; and in response to detecting the launching of the first process, providing a first notification from the kernel mode to the user mode in accordance with the received policy for the first process, wherein the first notification provides a trigger to the user mode for selecting, from the rules stored in the user mode, one or more rules related to the launching of the first process, and for providing the selected one or more rules related to the launching of the first process to at least one of the one or more filter drivers, wherein the policy further indicates when and/or how notifications are to be provided from the kernel mode to the user mode upon detection in the kernel mode of rundown of the first process and the method further comprises:

in response to detecting the rundown of the first process, providing a third notification, from the kernel mode to the user mode, in accordance with the received policy for the first process, wherein the third notification provides a trigger for:

selecting, from the rules stored in the user mode, one or more rules related to the rundown of the first process, replacing, in at least one of the one or more filter drivers to which the selected one or more rules related to the launching of the first process were provided, the provided one or more rules related to the launching of the first process with the selected one or more rules related to the rundown of the first process, if the rules stored in the user mode include at least one rule related to the rundown of the first process, and removing the one or more rules related to the launching of the first process from at least one of the one or more filter drivers to which the selected one or more rules related to the launching of the first process were provided, if the rules stored in the user mode do not include any rules related to the rundown of the first process.

21. A system for providing rules for a plurality of processes launchable in a user mode of a computer from the user mode to one or more filter drivers implemented in a kernel mode of the computer, the system comprising:

a processor configured with computer executable instructions comprising:

a managing kernel unit implemented in the kernel mode of the computer;

a process management unit implemented in the user mode of the computer; and a rule provider implemented in the user mode of the computer, wherein the rule provider is configured to store the rules, wherein the managing kernel unit is configured to:

obtain a policy for at least a first process of the plurality of processes, the policy indicating at least when and/or how notifications are to be provided from the kernel mode to the user mode upon detection in the kernel mode of launching of the first process and the policy further indicating when and/or how notifications are to be provided from the kernel mode to the user mode upon detection in the kernel mode of rundown of the first process, and in response to detecting the launching of the first process, provide a first notification to the process management unit in accordance with the obtained policy for the first process, and wherein the process management unit is configured to:

in response to receiving the first notification from the managing kernel unit, select, from the rules stored in the rule provider, one or more rules related to the launching of the first process, provide the selected one or more rules related to the launching of the first process from the rule provider to at least one of the one or more filter drivers and/or the managing kernel unit, in response to receiving from the managing kernel unit a third notification in accordance with the policy for the first process, select, from the rules stored in the rule provider, one or more rules related to the rundown of the first process, if the rules stored in the rule provider include at least one rule related to the rundown of the first process, replace, in the at least one of the one or more filter drivers and/or the managing kernel unit to which the selected one or more rules related to the launching of the first process were provided, the provided one or more rules related to the launching of the first process with the selected one or more rules related to the rundown of the first process, and if the rules stored in the rule provider do not include any rules related to the rundown of the first process, remove the one or more rules related to the launching of the first process from the at least one of the one or more filter drivers and/or the managing kernel unit to which the selected one or more rules related to the launching of the first process were provided.

22. A non-transitory, computer-readable storage medium storing instructions which, when executed by a processor in a user mode of a computer, perform a method for providing rules for a plurality of processes launchable in the user mode of the computer from the user mode to one or more filter drivers implemented in a kernel mode of the computer, the method comprising:

providing, from the user mode to the kernel mode, a policy for at least a first process of the plurality of processes, the policy indicating at least when and/or how notifications are to be provided from the kernel mode to the user mode upon detection in the kernel mode of launching of the first process and when and/or how notifications are to be provided from the kernel mode to the user mode upon detection in the kernel mode of rundown of the first process;

in response to receiving from the kernel mode a first notification in accordance with the policy for the first process, selecting, from the rules stored in the user mode, one or more rules related to the launching of the first process; and providing the selected one or more rules related to the launching of the first process from the user mode to at least one of the one or more filter drivers in the kernel mode, in response to receiving from the kernel mode a third notification in accordance with the policy for the first process, selecting, from the rules stored in the user mode, one or more rules related to the rundown of the first process;

if the rules stored in the user mode include at least one rule related to the rundown of the first process, replacing, in at least one of the one or more filter drivers to which the selected one or more rules related to the launching of the first process were provided, the provided one or more rules related to the launching of the first process with the selected one or more rules related to the rundown of the first process; and if the rules stored in the user mode do not include any rules related to the rundown of the first process, removing the one or more rules related to the launching of the first process from at least one of the one or more filter drivers to which the selected one or more rules related to the launching of the first process were provided.

* * * * *

UNITED STATES PATENT AND TRADEMARK OFFICE
CERTIFICATE OF CORRECTION

| | | |
|---|---|---|
| PATENT NO. | : 9,043,812 B2 | Page 1 of 1 |
| APPLICATION NO. | : 13/924879 | |
| DATED | : May 26, 2015 | |
| INVENTOR(S) | : Bob Janssen and Henri Van Bommel | |

It is certified that error appears in the above-identified patent and that said Letters Patent is hereby corrected as shown below:

On the title page insert item, --(30) Foreign Application Priority Data: June 28, 2012 (EP) 12174122.7--

Signed and Sealed this

Thirteenth Day of October, 2015

Michelle K. Lee
*Director of the United States Patent and Trademark Office*